United States Patent [19]
Wiegers et al.

[11] 3,927,109
[45] Dec. 16, 1975

[54] PROCESSES FOR THE PREPARATION OF CYCLIC ALDEHYDES

[75] Inventors: Wilhelmus J. Wiegers, Middletown; John B. Hall, Rumson, both of N.J.

[73] Assignee: International Flavors & Fragrances Inc., New York, N.Y.

[22] Filed: Aug. 26, 1974

[21] Appl. No.: 500,280

Related U.S. Application Data

[62] Division of Ser. No. 260,537, June 7, 1972, Pat. No. 3,869,516.

[52] U.S. Cl. ............................................. 260/598
[51] Int. Cl.² ....................................... C07C 47/44
[58] Field of Search ............ 260/598, 648 R, 648 C

[56] References Cited
OTHER PUBLICATIONS

Semmler et al., *Berichte der Deutches Chem. Ass.*, Vol. 45, (1912), 786–791.
Hass et al., *J.A.C.S.*, Vol 71, (1949), 1767–1769.

*Primary Examiner*—Bernard Helfin
*Attorney, Agent, or Firm*—Brooks Haidt Haffner & Delahunty

[57] ABSTRACT

Processes for the preparation of cyclic aldehydes such as cedrenal which comprise treating the corresponding hydrocarbon to form a halo derivative of the hydrocarbon and oxidizing the halo derivative with an alkali-metal salt of 2-nitropropane to form the aldehyde.

8 Claims, No Drawings

PROCESSES FOR THE PREPARATION OF CYCLIC ALDEHYDES

This is a division of U.S. Pat. application Ser. No. 260,537, filed June 7, 1972, now U.S. Pat. No. 3,869,516.

BACKGROUND OF THE INVENTION

The present invention provides processes for the production of useful cyclic aldehydes, which processes are economical, straightforward, and based on the use of a minimum of reactants.

Cyclic aldehydes have a variety of uses, and many such aldehydes are utilized as olfactory agents in perfume compositions and perfumed products and articles. An instance of such use is the material called cedrenal. This compound has desirable woody notes and can comprise various perfume compositions.

In the past it has been customary to prepare cedrenal by a series of reactions carried out on a suitable starting material. One such preparation is shown in Swiss Pat. No. 485,629. This prior art process is shown to start with alpha-cedrene which is converted to epoxycedrene by treatment with peracetic acid in a reaction medium. The epoxycedrene is then treated with lithium and a diamine to produce cedrenol and the cedrenol is subsequently halogenated with phosphorus tribromide and then oxidized with 2-nitropropane to provide cedrenal.

Halogenation of alpha-pinene with chlorine to provide a chloro isomer of the pinene is shown by Tishchenko and Matveyev, Zh. Obshch. Khim. 20, 1950. Oxidation reactions with nitropropane are shown in J.A.C.S. 81, 4223 and British Pat. No. 803,765. Various halogenation reactions are also shown by Kryukov et al, Zh. Org. Khim. 6(7), 1386 and Lauchenauer et al., Helvetica Chimica Acta 34(5), 1514.

THE INVENTION

Briefly, the present invention provides a method for simply and conveniently preparing cedrenal in good yields. The process comprises reacting alpha-cedrene with a halogen to obtain a halo derivative thereof and then oxidizing the halo derivative with 2-nitropropane to obtain cedrenal.

As used herein, alpha-cedrene is a compound having the structure:

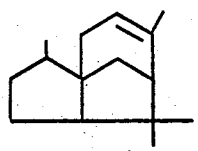

(I)

This is reacted to provide a halo derivative having the structure:

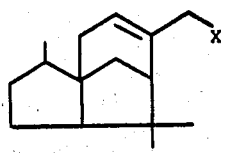

(II)

where X is a halogen atom as herein described, in some embodiments through an intermediate alpha-halo methylene derivative having the structure:

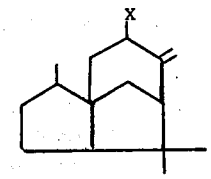

(III)

The halo derivative is then oxidized to provide cedrenal having the structure:

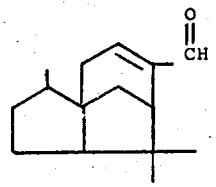

(IV)

The alpha-cedrene utilized in carrying out the present invention is commercially available and can be obtained from a natural source or by the dehydration of cedrol. Cedrol can be obtained from the oil of cedar and other trees. It is preferred that the alpha-cedrene used as a raw material be substantially pure, although lower purity materials can be used to carry out the reaction described herein with lower yields.

The initial step of the process is direct halogenation of alpha-cedrene to provide either the halo derivative directly or else to provide the alpha-halo methylene derivative which is then rearranged to provide the halo derivative. In the preferred embodiment of the invention, the halo derivative is provided directly. The halogens contemplated for use herein are chlorine, bromine, and iodine, with chlorine being the preferred halogen. The halogen is introduced directly into the alpha-cedrene, and in the case of chlorine, the halogen is bubbled into the cedrene. It is possible to utilize a reaction vehicle during this halogenation step but in certain embodiments of the invention it is preferred that no vehicle be used.

The direct halogenation in the absence of a basic material is carried out at temperatures from about 75° to about 175°C, with the preferred temperature range for chlorination being from about 125°–135°C, so as to provide a relatively rapid reaction rate with good control of the reaction. At these temperatures the time of halogen addition can vary from about one to about 25 hours, with periods from four to about eight hours being preferred utilizing chlorine at a temperature of 125°–135°C. Those skilled in the art will appreciate from the present disclosure that the foregoing ranges given for batch preparation can be suitably modified for a continuous production procedure, depending upon the particular halogen and reaction apparatus utilized.

The molar ratio of halogen to cedrene is desirably from about 0.5 to about 1.5 moles of halogen per mole of cedrene. It is generally preferred to use amounts of halogen close to the stoichiometric, and ratios of about 0.8 to about 1.1 moles of halogen per mole of cedrene are preferred. The halogenation can be carried out over a range of pressure, with atmospheric or slightly subatmospheric pressure being desirable. Subatmospheric pressures can give good results in certain embodiments of the invention, since hydrogen halide is removed from the reaction mass. This halogenation method provides the halo-cedrene derivative which can be directly oxidized to the aldehyde as more fully described hereinafter.

The halogenation can also be carried out to provide the alpha-chloro methylene derivative by reacting the halogen with cedrene in the presence of a basic material such as an alkai metal carbonate or bicarbonate or an alkaline earth metal carbonate or bicarbonate. A preferred basic material in certain embodiments hereof is sodium carbonate.

The molar ratio of basic material to halogen is desirably from about 0.4 to about one mole of alkaline material to one mole of halogen, with ratios of from 0.6:1 to 0.8:1 being preferred. The molar ratio of halogen to alpha-cedrene and the halogens utilized are the same as those set forth above in connection with the direct halogenation. It is desirable in this embodiment of the method that a vehicle be utilized, and water is a preferred vehicle. Other vehicles such as lower alkyl ethers like diethyl ether, hydrocarbons like hexane, and halogenated solvents such as carbon tetrachloride can also be present. This reaction is desirably carried out at temperatures from about 0° to about 75°C, with preferred embodiments of the invention utilizing temperatures of 10°–30°C. At these temperatures, reaction times of from about one to about 25 hours are used with the reaction preferably being carried out in from four to eight hours.

The pressure utilized can be somewhat subatmospheric or superatmospheric, but atmospheric pressures are preferred for yield and convenience of operation. This procedure provides the alpha-halo methylene derivative.

The halo methylene can, if desired, be separated from the reaction mixture and purified by conventional means. It is however desirable in certain aspects of this invention that the halo methylene derivative be isomerized directly to provide the halo derivative. The isomerization is preferably carried out by heating, desirably at temperatures from about 75° to about 175°C, with the preferred temperature being 125°–135°C.

The time required for good yields in the isomerization varies inversely with the temperatures utilized. Generally, it is desirable to conduct the isomerization during a time of from about one to about 25 hours. When the isomerization is conducted at the preferred temperatures of 125°–135°C, substantial completion is usually obtained from three to six hours.

The reaction can be carried out at subatmospheric or superatmospheric pressure, but it is generally preferred to use atmospheric pressure in certain embodiments hereof. If desired, the isomerization can be a catalytic one carried out with suitable metal salts. Isomerization can be carried out on a continuous basis as can the halogenation to provide the halo-methylene derivative.

It will accordingly be seen from the present disclosure that the halogenation of the cedrene is desirably carried out in the temperature range of 0° to 175°C. While the halogenation in the presence of a basic material requires an extra step to isomerize the alpha-halo methylene derivative to the halo derivative, this reaction can be carried out at ordinary room temperatures. Hence, it can be advantageous in some embodiments to utilize the lower temperature route, despite the extra step involved.

After preparation of the halo derivative, it is directly oxidized to cedrenal with an alkali-metal salt of 2-nitropropane, such as the potassium salt of 2-nitropropane. The nitropropane oxidation is carried out by treating the halo derivative at temperatures of from about 70° to about 100°C with the alkali-metal salt of 2-nitropropane. The preferred temperature of this step of the process is 85°–95°C. Reaction times of from about two to about ten hours are used, with times of from five to seven hours being preferred.

The oxidation is preferably carried out in the presence of an inert vehicle, desirably a lower alcohol having from one to four carbon atoms. A preferred vehicle is isopropyl alcohol.

A substantially stoichiometric amount of alkali metal hydroxide in relation to the 2-nitropropane is desirably used to form the alkali metal salt in situ. It is preferred to utilize the 2-nitropropane in slight excess of the alkali metal hydroxide.

During the oxidation reaction, it is desirable to have a small quantity of alkali metal iodide, such as potassium iodide, present in the vehicle. Amounts of iodide on the order of 0.5 to 1% of the quantity of halo derivative are utilized. All parts, proportions, percentages, and ratios herein are by weight unless otherwise indicated.

It is preferred to carry out the oxidation by feeding the halo derivative to a mixture of vehicle which is in admixture with the nitropropane salt.

After the oxidation reaction has been completed, the cedrenal so obtained is then washed, dried, and freed of vehicle and other ingredients of the reaction mixture by conventional methods. The cedrenal can be purified or isolated by conventional techniques such as distillation, extraction, preparative chromatographic techniques and the like. A preferred procedure is vacuum distillation.

The following Examples are given to illustrate embodiments of the invention as it is now preferred to practice it. It will be understood that these examples are illustrative, and the invention is not to be considered as restricted thereto except as indicated in the appended claims.

EXAMPLE I

Preparation of Chloro Derivative

A 250 ml reaction flask equipped with stirrer, thermometer, reflux condenser, chlorine inlet tube, gas bubbler outlet, heating mantle, and temperature controller is charged with 102 g of alpha-cedrene, and the contents are heated to 130°C. This temperature is maintained during a 3½ hour time during which 37 g of chlorine is sparged into the reaction mass.

The reaction mass is maintained at a temperature of 130°C for an additional hour. Infrared (IR) spectrometric analysis shows that the product is the chloro cedrene derivative, II on Page 3.

EXAMPLE II

Oxidation of Chloro Derivative

A 12-liter reaction flask equipped with stirrer, thermometer, reflux condenser, 2-liter dropping funnel with nitrogen line, and heating mantle is charged with 1230 g of isopropyl alcohol, 537 g of potassium hydroxide flakes, and 7.5 g of potassium iodide. The reaction mass is heated to reflux, 804 g of 2-nitropropane is placed in the dropping funnel, and the nitropropane is added to the flask contents during 15 minutes while the temperature is maintained in the range of 89°–95°C and the flask contents are stirred. The potassium salt of 2-nitropropane is thus formed.

The reaction mass is refluxed for 15 minutes after addition of the nitropropane is complete, while 2200 g of the chloro derivative prepared according to the procedure illustrated in Example I is placed in the dropping funnel. The temperature of the mass is maintained at 86°–93°C while the chloro derivative is added over a period of 30 minutes with stirring. The reaction mass is then refluxed for an additional five hours with stirring.

After addition of the chloro derivative is complete, 779 g of isopropyl alcohol is removed from the mass by distillation. Four liters of water is then added, and the reaction mass is stirred for 15 minutes, whereupon an aqueous phase and an organic phase form. The aqueous phase is removed from the organic phase and is extracted with toluene, the toluene extract being combined with the organic phase. The organic phase is then washed thrice with 750 ml portions of 5% aqueous sodium chloride. The toluene is stripped off and the material is rushed over using a three-inch packed column. The distillate is redistilled using a three-foot packed column at a vapor temperature of 129°–130°C under 2.5–3.0 mm Hg.

IR, nuclear magnetic resonance (NMR) and mass spectral analyses confirm that the 690 g of product is cedrenal.

EXAMPLE III

A three-liter reaction flask equipped with a stirrer, reflux condenser, dropping funnel, chlorine inlet, two gas bubblers, and cooling bath is charged with 600 g of water and 297 g of sodium carbonate. The flask contents are stirred for 30 minutes and then 1020 g of alpha-cedrene are added. While the temperature of the flask contents is maintained at 15°–20°C, chlorine gas is bubbled through the mixture for five hours at the rate of 68 g an hour. Approximately halfway through the addition of chlorine, 300 g of water is added to improve the ease of mixing.

After chlorine addition is complete 700 g of water is added and the flask contents are stirred for 30 minutes. The stirring is discontinued, the flask contents separate into an aqueous and an organic phase, and the aqueous phase is extracted with 250 g of toluene. The toluene extract is combined with the organic layer and washed twice with 250 g of 5% aqueous sodium chloride solution.

The washed material is the alpha-chloro methylene derivative (Formula III on Page 3). The toluene is stripped off and the material is placed under approximately 90 mm Hg vacuum, held for 5 hours at 150°C to isomerize it to the chloro derivative (compound II on Page 3) in a yield of 1049 g of crude compound II.

This derivative is oxidized to produce cedrenal as described herein.

What is claimed is:

1. A process for the production of cyclic carbonyl compounds which comprises reacting alpha-cedrene with a halogen at temperatures of 0° to 75°C in the presence of a basic material to provide an alpha-halo methylene derivative having the structure

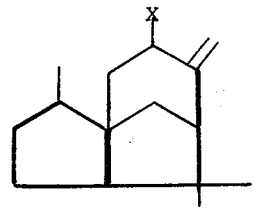

isomerizing the alpha-halo methylene derivative by heating to a temperature of from 75° to 175°C to form a halo derivative having the structure

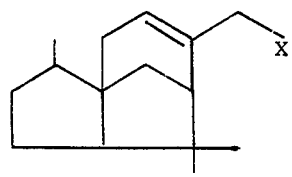

and oxidizing the halo derivative with an alkali metal salt of 2-nitropropane to obtain cedrenal, wherein X is chloro, bromo, or iodo.

2. A process according to claim 1 wherein X is chloro.

3. A process according to claim 1 wherein the reaction is carried out in the presence of an alkali metal carbonate or bicarbonate or an alkaline earth carbonate or bicarbonate.

4. A process according to claim 3 wherein the basic material is sodium carbonate.

5. A process according to claim 1 wherein the heating is carried out for from 1 to 25 hours.

6. A process according to claim 1 wherein the oxidation is carried out at 70° to 100°C.

7. A process according to claim 6 wherein the oxidation is carried out in the presence of an inert vehicle, and an alkali metal iodide.

8. A process according to claim 1 wherein the alkali metal is potassium.

* * * * *